US012810336B2

(12) United States Patent
Ma et al.

(10) Patent No.: US 12,810,336 B2
(45) **Date of Patent: *Nov. 24, 2026**

(54) SYSTEM AND METHOD FOR MULTI-PATH COMPLIMENTARY ITEMS RECOMMENDATIONS

(71) Applicant: Walmart Apollo, LLC, Bentonville, AR (US)

(72) Inventors: Luyi Ma, Sunnyvale, CA (US); Hyun Duk Cho, San Francisco, CA (US); Sushant Kumar, Sunnyvale, CA (US); Kannan Achan, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 153 days.

This patent is subject to a terminal disclaimer.

(21) Appl. No.: 18/623,691

(22) Filed: Apr. 1, 2024

(65) Prior Publication Data

US 2024/0249340 A1 Jul. 25, 2024

Related U.S. Application Data

(63) Continuation of application No. 17/163,529, filed on Jan. 31, 2021, now Pat. No. 11,948,179.

(51) Int. Cl.

*G06Q 30/0601* (2023.01)
*G06F 18/22* (2023.01)
*G06N 7/01* (2023.01)

(52) U.S. Cl.

CPC ......... *G06Q 30/0631* (2013.01); *G06F 18/22* (2023.01); *G06N 7/01* (2023.01); *G06Q 30/0633* (2013.01); *G06Q 30/0641* (2013.01)

(58) Field of Classification Search

CPC ......... G06Q 30/0631; G06Q 30/06311; G06Q 30/06312; G06Q 30/06313;

(Continued)

(56) References Cited

U.S. PATENT DOCUMENTS 10,148,680 B1 * 12/2018 Segev ................. H04L 63/1425
10,861,077 B1 * 12/2020 Liu ........................ G06Q 30/06

(Continued)

OTHER PUBLICATIONS

Iqbal Khalid, et al., Gaussian Graphical Models Identify Networks of Dietary Intake in a German Adult Population, The Journal of Nutrition, vol. 146, Issue 3, p. 646-652, Mar. 2016 (Year: 2016).*

(Continued)

*Primary Examiner* — Anna Mae Mitros
(74) *Attorney, Agent, or Firm* — FOLEY & LARDNER LLP

(57) ABSTRACT

A system including one or more processors and one or more non-transitory computer-readable media storing computing instructions that, when executed on the one or more processors, cause the one or more processors to perform operations: generating, using a trained machine-learning model, personalized product-type metrics for a user based on historic activity of the user and product-type pairs in an item taxonomy; determining top product types for the user based on an anchor item; determining a set of first items associated with the top product types; ranking each item in the set of first items for (i) the anchor item and (ii) for each item in the set of first items; and selecting, based on the ranking, a set of top items from the set of first items to be personalized complementary item recommendations for the user based on the anchor item. Other embodiments are described.

20 Claims, 10 Drawing Sheets

(58) Field of Classification Search

CPC ....... G06Q 30/06314; G06Q 30/06315; G06Q 30/0633; G06Q 30/0635; G06Q 30/06331; G06Q 30/06332; G06Q 30/06333; G06Q 30/06334; G06Q 30/0637; G06Q 10/083; G06Q 10/087; G06Q 30/0641; G06Q 30/0643; G06Q 30/06431; G06Q 30/06432; G06Q 30/06433; G06Q 30/06434; G06Q 30/06435; G06Q 30/0644; G06Q 30/06442; G06Q 30/06444; G06Q 30/0601–0645; G06N 7/01; G06F 18/22

USPC ........................................ 705/26.7, 26.1–27.2

See application file for complete search history.

(56) References Cited

U.S. PATENT DOCUMENTS

| | | | | |
|---|---|---|---|---|
| 11,200,445 | B2 | 12/2021 | Afshar et al. | |
| 11,315,165 | B2 | 4/2022 | Korpeoglu et al. | |
| 11,948,179 | B2 * | 4/2024 | Ma | G06Q 30/0641 |
| 2008/0294617 | A1 | 11/2008 | Chakrabarti et al. | |
| 2018/0047071 | A1 * | 2/2018 | Hsu | G06Q 30/0282 |
| 2018/0067968 | A1 | 3/2018 | Cheung | |
| 2018/0114113 | A1 * | 4/2018 | Ghahramani | G06N 7/01 |
| 2020/0334734 | A1 * | 10/2020 | Al Jadda | G06N 3/09 |
| 2022/0129709 | A1 * | 4/2022 | Canal | G06F 9/4451 |

OTHER PUBLICATIONS

Greg Linden et al. "Amazon.com Recommendations Item-to-Item Collaborative Filtering", IEEE Internet Computing, Jan./Feb. 2003, pp. 76-80. (Year: 2003) Jan. 2003.

Oscar Contreras Carrasco "Gaussian Mixture Models Explained" Towards Data Science Jun. 3, 2019. Retrieved from https://towardsdatascience.com/gaussian-mixture-models-explained-6986aaf5a95 (Year: 2019) Jun. 3, 2019.

Jiang, J., et al., "Convolutional Gaussian Embeddings for Personalized Recommendation with Uncertainty," Proceedings of the 28th International Joint Conference on Artificial Intelligence ((IJCAI-19), pp. 2642-2648, arXiv:2006:10932 2019.

Deshpande M. and Karypis G., "Item-Based Top-N Recommendation Algorithms," ACM Transactions on Information Systems, vol. 22, No. 1, Jan. 2004, pp. 143-177, 35 pgs. Jan. 2004.

Zhao, T., "Improving Complementary-Product Recommendations," retrieved Dec. 29, 2020 from https://www.amazon.science/blog/improving-complementary-product-recommendations, published Oct. 7, 2020; 12 pgs. Oct. 7, 2020.

* cited by examiner

800

SYSTEM AND METHOD FOR MULTI-PATH COMPLIMENTARY ITEMS RECOMMENDATIONS

CROSS-REFERENCE TO RELATED APPLICATIONS

The present application is a Continuation application of U.S. patent application, Ser. No. 17/163,529, filed on Jan. 31, 2021, to be issued on Apr. 2, 2024, and is herewith incorporated by reference in its entirety.

TECHNICAL FIELD

This disclosure relates generally relates to multi-path complimentary items recommendations.

BACKGROUND

Generally, users purchase more than one item during an online visit with many items that are complimentary to each other. Some items can be complimentary to more than one item and can be part of different topic categories. For example, a user can be interested in baking soda, but the topic category of the user's interest can be either as a cleaning product or as a baking product, in which case it can be desired that complementary item recommendations for the anchor item of baking soda generally would not be the same.

BRIEF DESCRIPTION OF THE DRAWINGS

To facilitate further description of the embodiments, the following drawings are provided in which.

Figure 1:
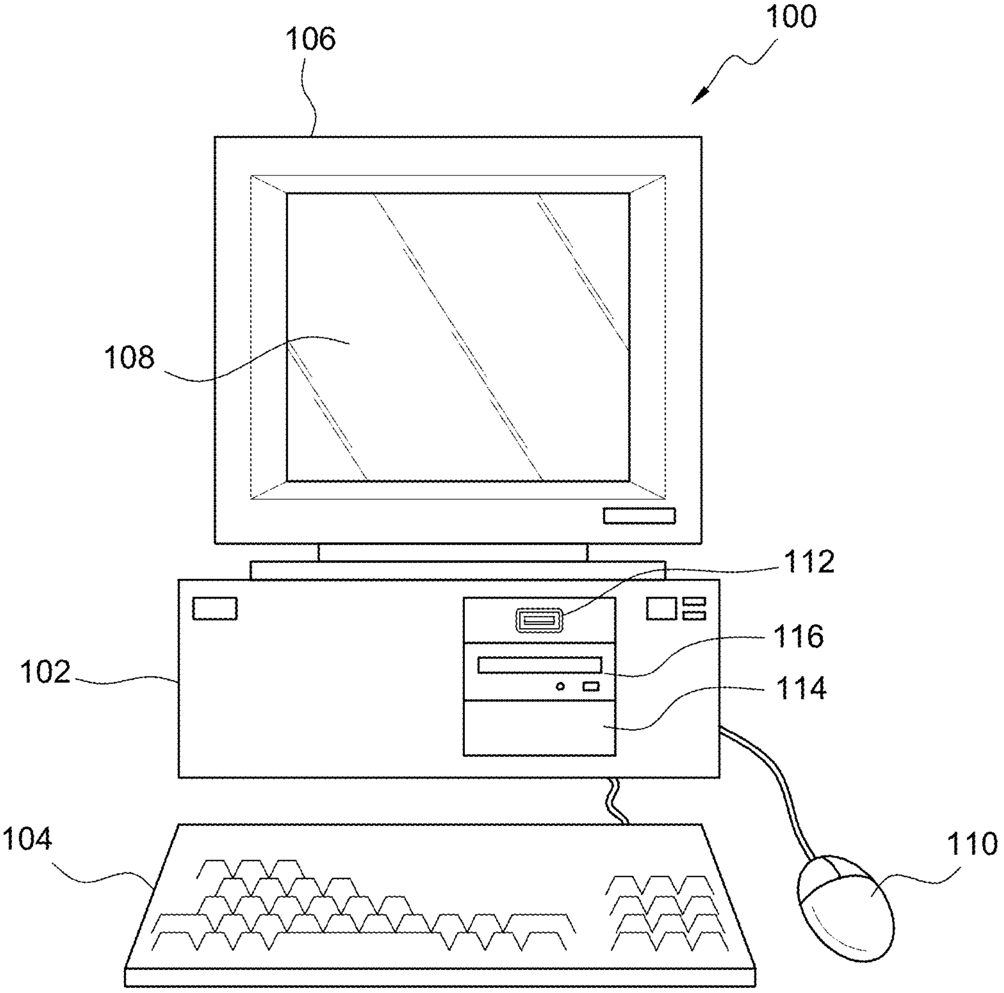
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than 1 minute, 5 minutes, 10 minutes, or another suitable time delay period.

DESCRIPTION OF EXAMPLES OF EMBODIMENTS

Figure 2:
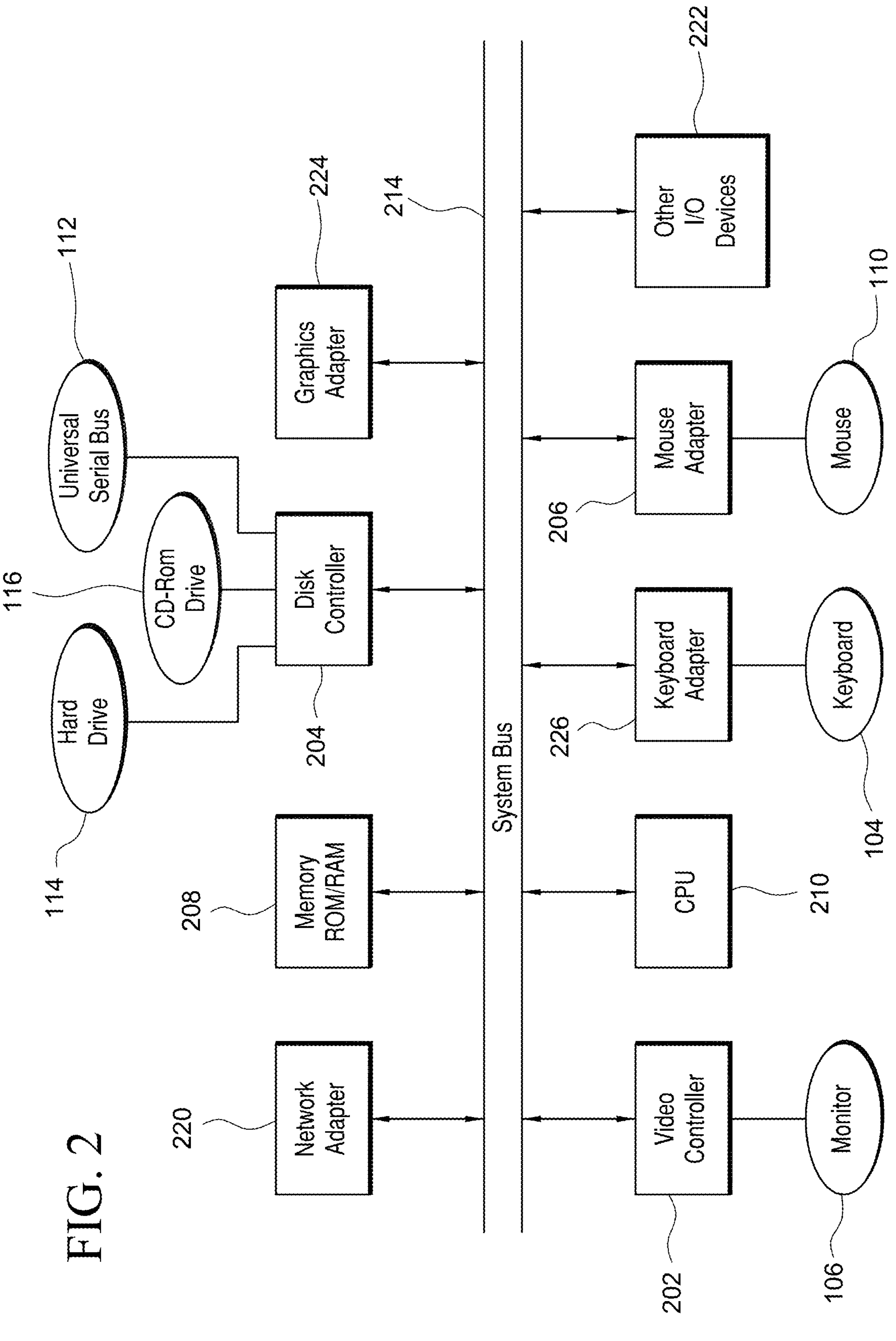
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIG. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
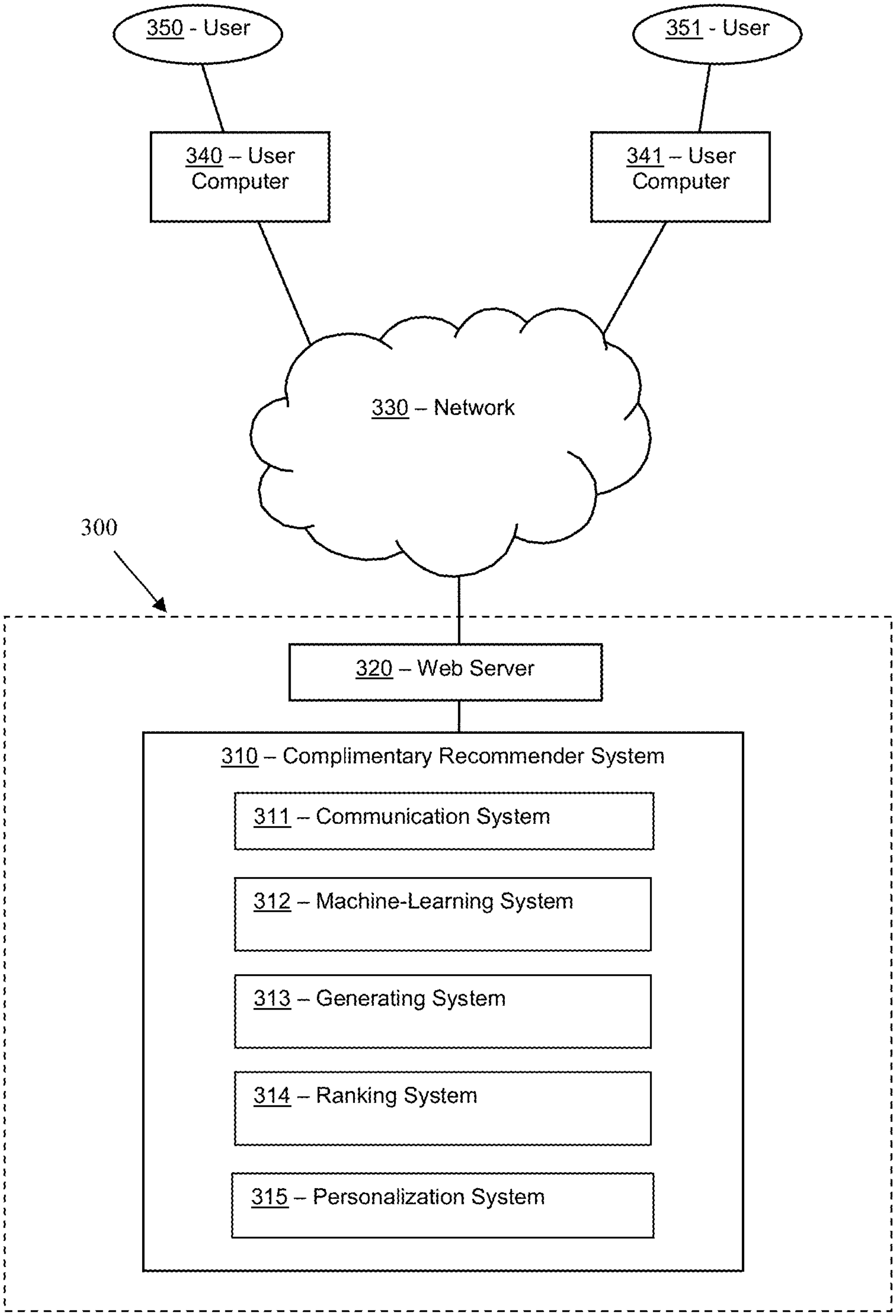
FIG. 3 illustrates a block diagram of a system that can be employed for an automatic reactive attribute management platform for a product, according to an embodiment.

Turning ahead in the drawings, FIG. 3 illustrates a block diagram of a system 300 that can be employed for automatically determining complimentary items recommendations, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a complimentary recommender system 310 and/or a web server 320. Complimentary recommender system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, complimentary recommender system 310 and/or web server 320. Additional details regarding complimentary recommender system 310 and/or web server 320 are described herein.

In a number of embodiments, each of complimentary recommender system 310 and/or web server 320 can be a special-purpose computer programed specifically to perform specific functions not associated with a general-purpose computer, as described in greater detail below.

In some embodiments, web server 320 can be in data communication through Network 330 with one or more user computers, such as user computers 340 and/or 341. Network 330 can be a public network, a private network or a hybrid network. In some embodiments, user computers 340-341 can be used by users, such as users 350 and 351, which also can be referred to as customers, in which case, user computers 340 and 341 can be referred to as customer computers. In many embodiments, web server 320 can host one or more sites (e.g., websites) that allow users to browse and/or search for items (e.g., products), to add items to an electronic shopping cart, and/or to order (e.g., purchase) items, in addition to other suitable activities.

In some embodiments, an internal network that is not open to the public can be used for communications between complimentary recommender system 310 and/or web server 320 within system 300. Accordingly, in some embodiments, complimentary recommender system 310 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

In several embodiments, complimentary recommender system 310 can include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to complimentary recommender system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of complimentary recommender system 310. In a similar manner, the processors and/or the non-transitory computer-readable media can be local and/or remote to each other.

Meanwhile, in many embodiments, complimentary recommender system 310 also can be configured to communicate with and/or include one or more databases. The one or more databases can include a product database that contains information about products, items, or SKUs (stock keeping units), for example, among other data as described herein, such as described herein in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between complimentary recommender system 310, web server 320, and/or the one or more databases can be implemented using any suitable manner of wired and/or wireless communication. Accordingly, complimentary recommender system 310 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, complimentary recommender system 310 can include a communication system 311, a machine-learning system 312, a generating system 313, a ranking system 314, and/or a personalization system 315. In many embodiments, the systems of complimentary recommender system 310 can be modules of computing instructions (e.g., software modules) stored at non-transitory computer readable media that operate on one or more processors. In other embodiments, the systems of complimentary recommender system 310 can be implemented in hardware. Complimentary recommender system 310 can be a computer system, such as computer system 100 (FIG. 1), as described above, and can be a single computer, a single server, or a cluster or collection of computers or servers, or a cloud of computers or servers. In another embodiment, a single computer system can host complimentary recommender system 310. Additional details regarding complimentary recommender system 310 and the components thereof are described herein.

Figure 4:
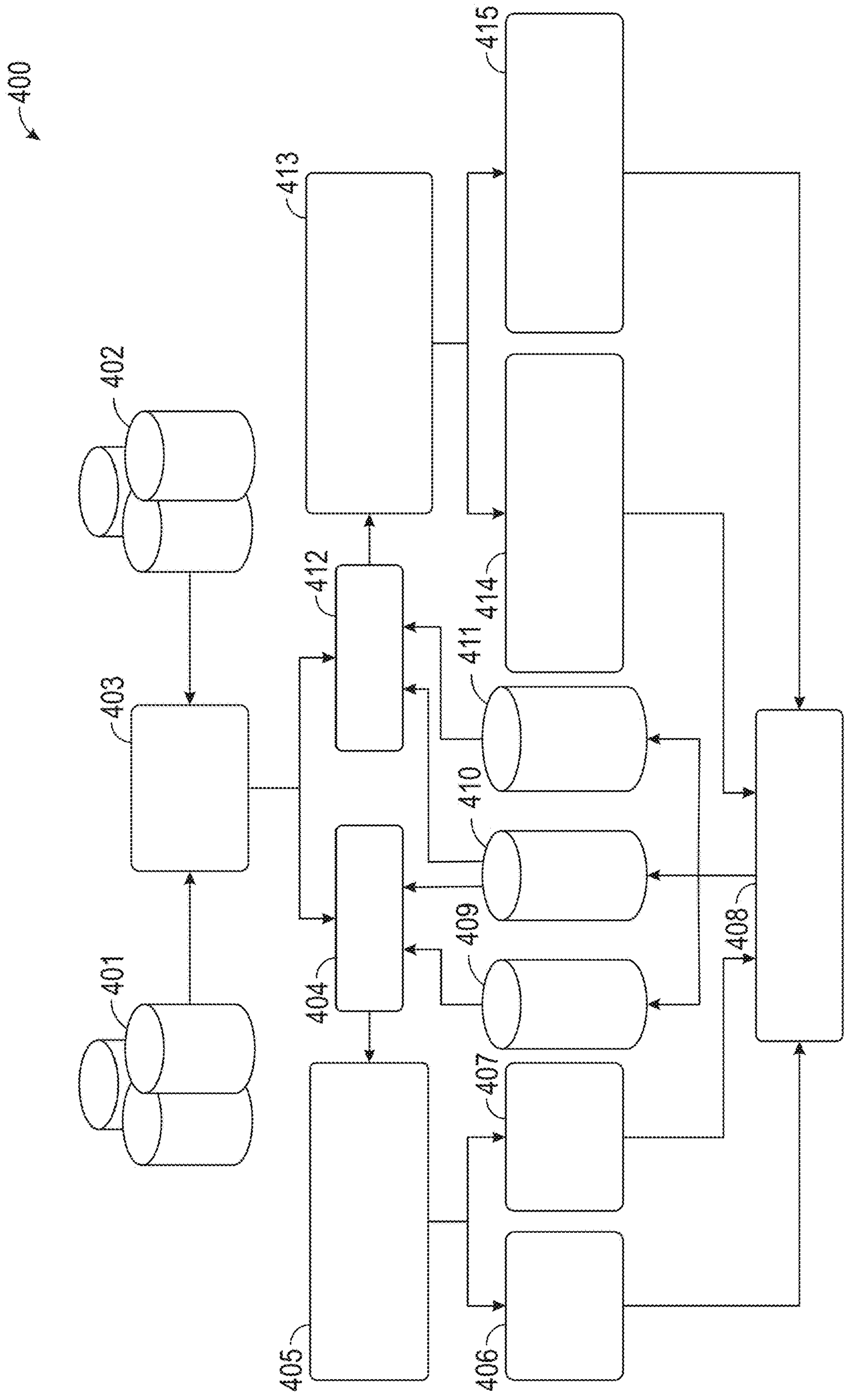
FIG. 4 illustrates a flowchart for a method, according to an embodiment.

Jumping ahead in the drawings, FIG. 4 illustrates a flow chart for a method 400, according to another embodiment. Method 400 can be a method of a training pipeline for a complimentary recommender system. In some embodiments, method 400 can be a method of automatically recommending a personalized complimentary item for an anchor item with multi-topic uses that can belong to different product categories and/or more than one product-types. In many embodiments, determining a personalized item recommendation that matches the use of the anchor item on a particular day can be implemented based on a machine-learning model described herein. Method 400 is merely exemplary and is not limited to the embodiments presented herein. Method 400 can be employed in many different embodiments and/or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400.

In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as complimentary recommender system 310 (FIG. 3) and/or web server 320 (FIG. 3). The processor(s) can be similar or identical to the processor(s) described above with respect to computer system 100 (FIG. 1).

Referring to FIG. 4, method 400 can include activities of a training pipeline that can create training data sets for a machine-learning model to determine whether two items belonging to different product categories can be complimentary items that a particular user would purchase together. The training data set can process historical user activities such as items co-purchased by users during a certain period of time where an anchor item can belong to more than one product-type (e.g., disambiguation).

In some embodiments, method 400 can include an activity 403 of data processing of receiving co-purchase item pairs and product-type pairs. In a number of embodiments, co-purchase item pairs can be received from user activity data 401, and product-type pairs can be received from item taxonomy 402. In some embodiments, user activity data can include add-to-cart sequences for users, such as users 350-351 (FIG. 3), and/or click data, co-purchase histories, item pairs, product-type pairs, and/or another suitable type of item data. For example, a user might purchase baking soda, flour, and bananas online on a certain day, then purchase baking soda, detergent, and bananas online on another day, and then purchase baking soda, milk, and bananas on yet another day. In this example, the product baking soda can be grouped as an item with product-type topic disambiguation where determining an intent of the user can signal which complementary product-type can or cannot be recommended to a user. In several embodiments, item taxonomy 402 can include a mapping from items to product-types. In various embodiments, data from activity 403 that is input into the training pipeline can be partitioned into two separate sub-pipeline processing methods for (i) item pairs (a first sub-pipeline 404) and (ii) product-type pairs (a second sub-pipeline 412). In several embodiments, each sub-pipeline can be run sequentially and/or concurrently.

Figure 9:
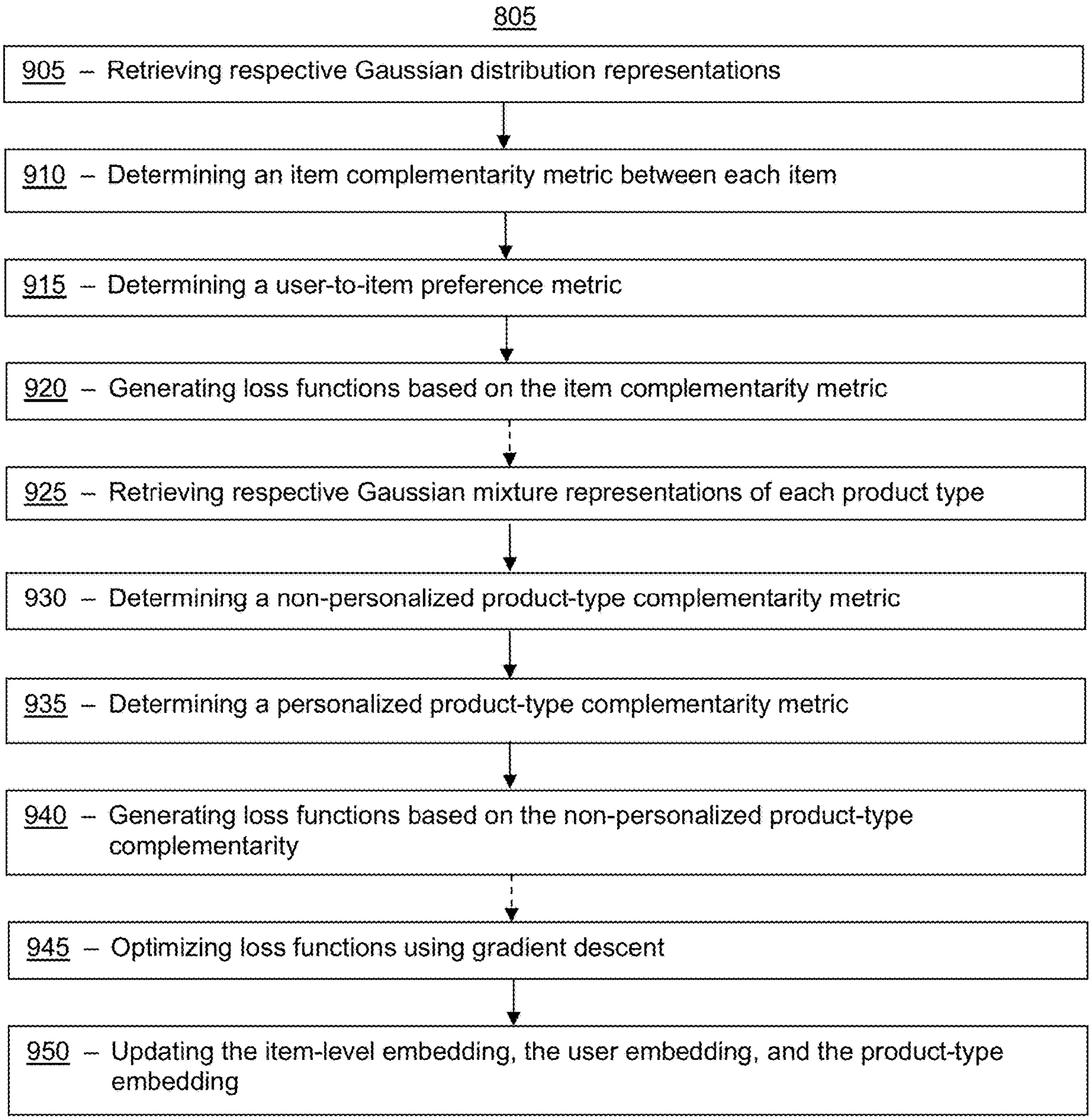
FIG. 9 illustrates a flowchart for a method, according to another embodiment.

In various embodiments, first sub-pipeline 404 of item-level modeling can include an activity 405 of item-level modeling, an activity 406 of modeling item complementarity, an activity 407 of modeling user-to-item preference, and/or an activity 408 of optimization of loss functions for automatic parameter learning. In some embodiments, item-pairs co-purchased by a user can be processed in activity 405 to determine pair each co-purchased item another item and/or to process each item in a pair of co-purchased items by a Gaussian distribution with a user to determine whether each pair can be a complementary pair or whether each pair cannot be a complementary pair. Activity 405 can be similar or identical to activity 905 (FIG. 9, described below). In several embodiments, the output of activity 405 can be used in activity 406 and activity 407. In many embodiments, activity 406 can model item complementarity with a probability product kernel. Activity 406 can be similar or identical to activity 910 (FIG. 9, described below). In several embodiments, activity 407 can model user-to-item preference for both items in the item pair. Activity 407 can be similar or identical to activity 915 (FIG. 9, described below). In various embodiments, each output of activity 406 and 407 can generate a loss function, which can be similar or identical to activity 920 (FIG. 9, described below). These loss functions can be used in activity 408, which can include a combination of loss functions to optimize automatic parameter learning. In many embodiments, activity 408 can generate an item-level embedding Gaussian distribution 409 and/or a user embedding 410.

In a number of embodiments, second sub-pipeline 412 of product-type modeling can include an activity 413 of product-type modeling, an activity 414 of modeling product-type complementarity with non-personalized component weight, an activity 415 of modeling product-type complementarity with personalized component weight, and/or activity 408 of optimization of loss functions for automatic parameter learning. In various embodiments, product-type pairs mapped from item taxonomy 402 can be processed by activity 413 of product-type level modeling to determine complimentary items in product-types from a catalog and/or process each product-type in a pair of co-purchased product-type modeled by a Gaussian Mixture distribution with a user to illustrate whether each product-type pair can be a complementary pair or whether each pair cannot be a complementary pair. Activity 413 can be similar or identical to activity 925 (FIG. 9, described below). In several embodiments, the output of activity 413 can be used in activity 414 and activity 415. In many embodiments, activity 414 can model product-type complementarity with probability product kernel at global level with non-personalized component weight. Activity 414 can be similar or identical to activity 930 (FIG. 9, described below). In several embodiments, activity 415 can model product-type complementarity with probability product kernel at individual level with personalized component weight. Activity 415 can be similar or identical to activity 935 (FIG. 9, described below). In various embodiments, each output of activity 414 and 415 can generate a loss function, which can be similar or identical to activity 940 (FIG. 9, described below). These loss functions can be used in activity 408, which can include a combination of loss functions to optimize automatic parameter learning. In many embodiments, activity 408 outputs data for activity 414 for input into to generating a product-type-level embedding Gaussian mixture distribution 411 and/or user embedding 410. Activity 408 of optimizing loss functions can be similar or identical to activity 945 (FIG. 9, described below). Updating item-level embedding Gaussian distribution 409, user embedding 410, and/or product-type-level embedding Gaussian mixture distribution 411 can be similar or identical to activity 950 (FIG. 9, described below).

Figure 5:
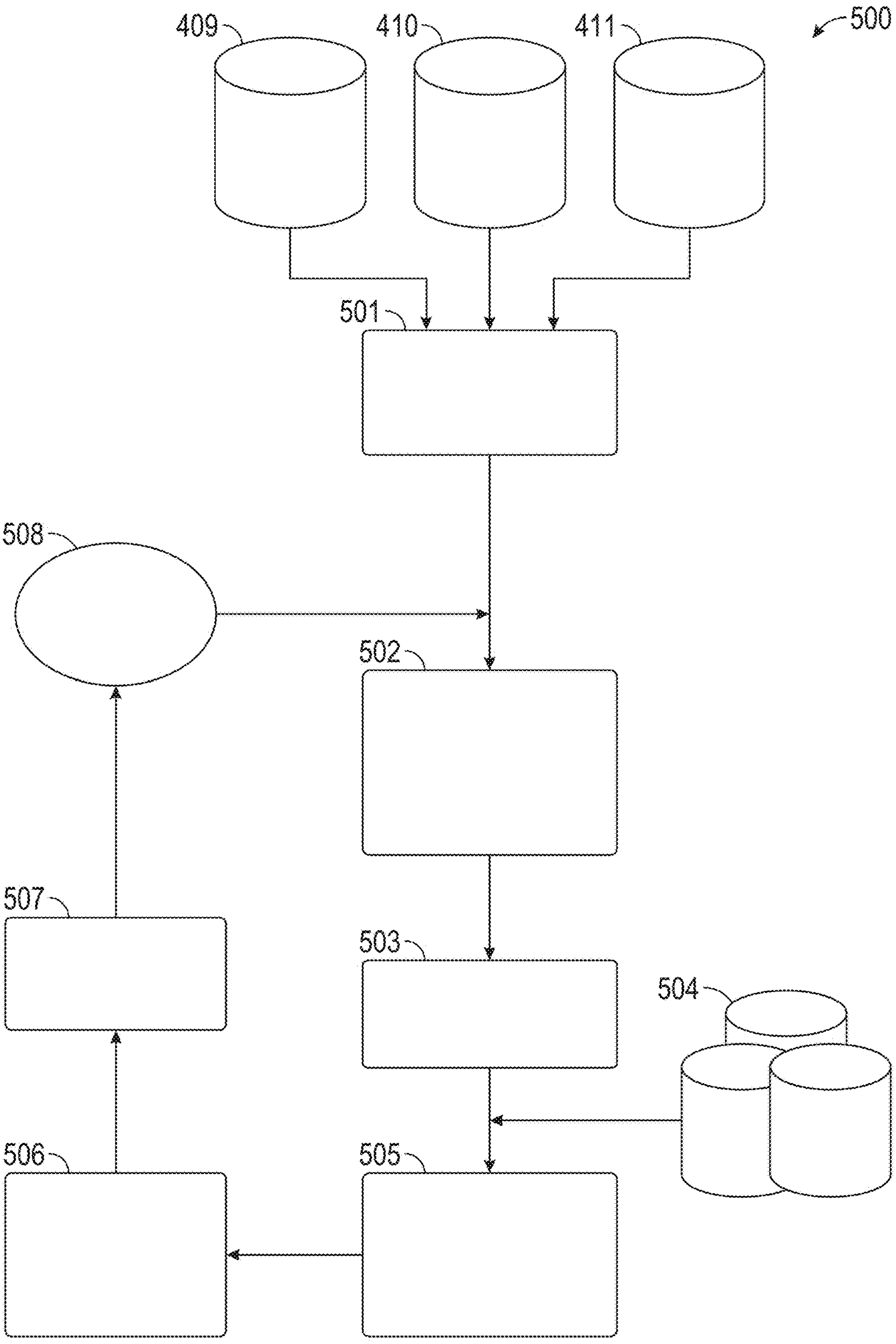
FIG. 5 illustrates a flowchart for a method, according to an embodiment.

Turning ahead in the drawings, FIG. 5 illustrates a flow chart for a method 500, according to another embodiment. In some embodiments, method 500 can be a method of automatically generating complimentary item recommendations with user-topic awareness for each user and query item using a machine-learning model. In several embodiments, method 500 also can compute a personalized list of complimentary items for an anchor item based on generating a non-personalized list of complimentary items. Method 500 is merely exemplary and is not limited to the embodiments presented herein. Method 500 can be employed in many different embodiments and/or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped. In several embodiments, system 300 (FIG. 3) can be suitable to perform method 500 and/or one or more of the activities of method 500.

In these or other embodiments, one or more of the activities of method 500 can be implemented as one or more computing instructions configured to run at one or more processors and configured to be stored at one or more non-transitory computer-readable media. Such non-transitory computer-readable media can be part of a computer system such as complimentary recommender system 310 (FIG. 3) and/or web server 320 (FIG. 3). The processor(s) can be similar or identical to the processor(s) described above with respect to computer system 100 (FIG. 1).

Referring to FIG. 5, method 500 can use a machine-learning model trained in method 400. For example, item-level embedding Gaussian distribution 409, user embedding 410, and/or product-type-level embedding Gaussian mixture distribution 411 generated in method 400 can be used in method 500 to determine a non-personalized list of complimentary items for an anchor item with disambiguation and/or to determine a personalized list of complimentary items for the anchor item for a user based on the output of the non-personalized list.

Figure 8:
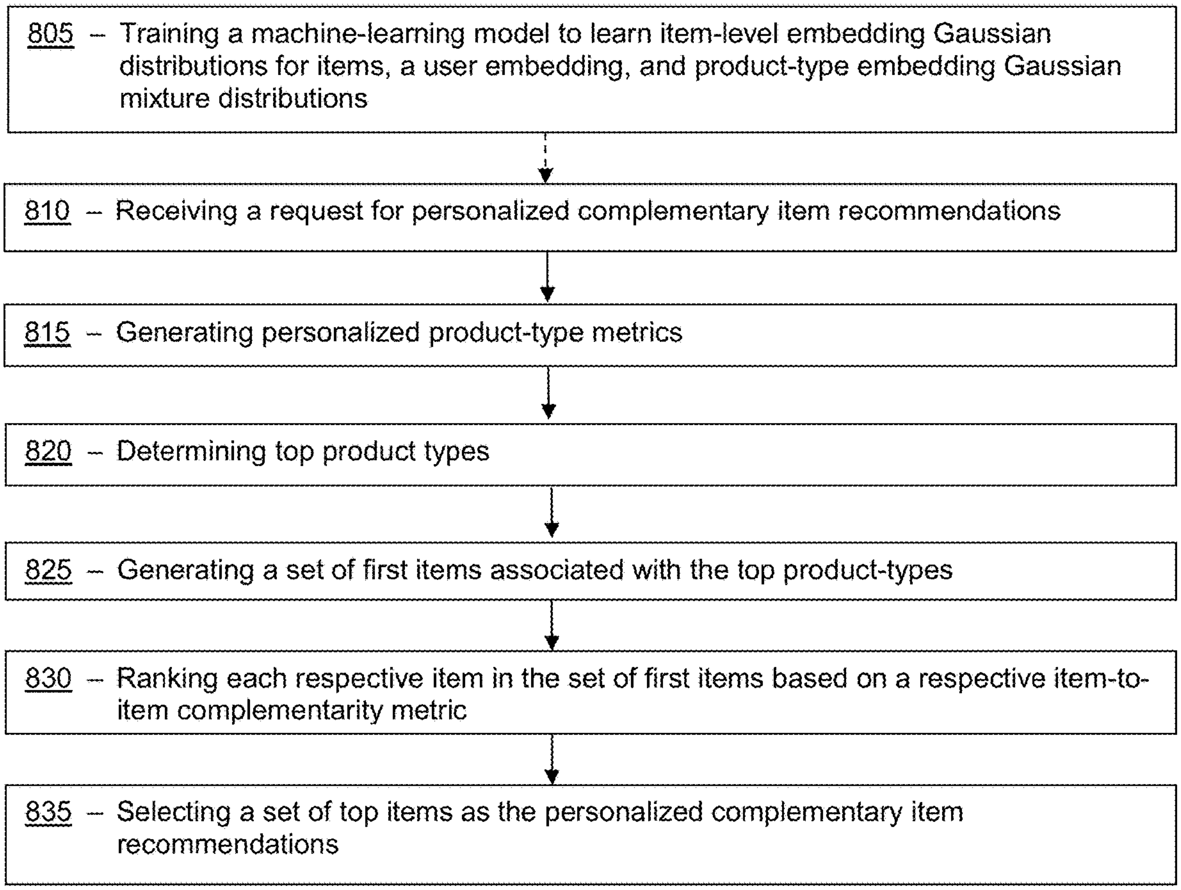
FIG. 8 illustrates a flowchart for a method, according to another embodiment.

In some embodiments, method 500 can include an activity 508 of receiving a request for a complimentary item recommendation for a query item for a user. Activity 508 can be similar or identical to block 810 (FIG. 8, described below).

In several embodiments, method 500 can include an activity 501 of reading item, user, and product-type representations from the models trained in method 400. For example, activity 501 can include reading item-level embedding Gaussian distribution 409, user embedding 410, and/or product-type-level embedding Gaussian mixture distribution 411. In various embodiments, the training data sets from the training data pipeline in FIG. 4 can be processed using an offline process prior to receiving a request from activity 508.

In several embodiments, after the request is received, method 500 can include an activity 502 of computing personalized product-types from user embedding 410 and product-type Gaussian Mixture distribution 411. Activity 502 can be similar or identical to activity 815 (FIG. 8, described below).

In various embodiments, method 500 also can include an activity 503 of computing a top-Z relevant product types for the query item and the user. Activity 503 can be similar or identical to activity 820 (FIG. 8, described below).

In several embodiments, method 500 can additionally include an activity 505 of generating a first item set of complimentary items by using the top-Z product-types generated in activity 503 and an item taxonomy 504, which can include a (item, product-type) mapping for each item. Activity 505 can be similar or identical to activity 825 (FIG. 8, described below).

In various embodiments, method 500 further can include an activity 506 of ranking the items in the first item set by item-to-item complementarity. Activity 506 can be similar or identical to activity 830 (FIG. 8, described below).

In some embodiments, method 500 additionally can include an activity 507 of retaining a threshold number of top-N items, which can be output to the user. Activity 507 can be similar or identical to activity 835 (FIG. 8, described below).

Figure 6:
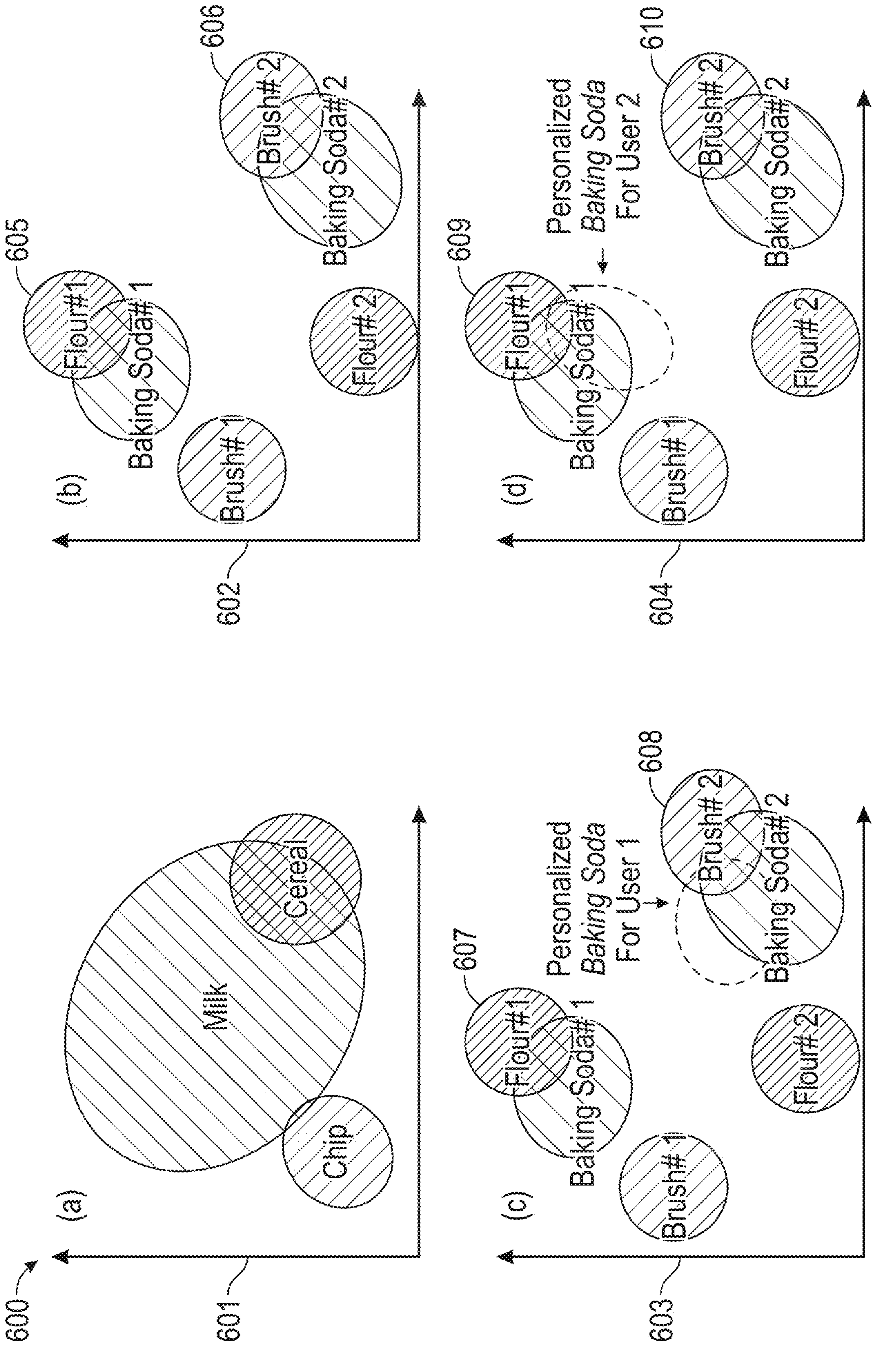
FIG. 6 illustrates an exemplary Gaussian distribution embedding.

Turning ahead in the drawings, FIG. 6 illustrates graphs 600, such as graphs 601-604, which can illustrate examples of Gaussian distributions, as shown in graph 601, and examples of Gaussian mixtures, as shown in graphs 602-604, in which each Gaussian mixture represents a projection of the product-type under a certain topic.

Graph 601 illustrates examples of uncertainty in co-purchasing certain items (e.g., item-pairs). For example, milk and chips can be purchased together yet not complimentary items in a same product category, the Gaussian distributions for milk and chips barely overlaps with each other, indicating a lower level of complementarity for the item-pair. Whereas, for co-purchased items, such as milk and cereal, the Gaussian distributions overlap between the two products, which can indicate a level of complementarity for the two co-purchased items.

Graph 602 illustrates examples of multi-topic disambiguation for baking soda, as baking soda can be complementary in at least two different product categories. For example, baking soda can be a complementary item under topics for both baking and home cleaning, as indicated by the level of overlap of baking soda #1 with flour #1 in a Gaussian mixture 605, and as indicated by the level of overlap of baking soda #2 with brush #2 in a Gaussian mixture 606. In various embodiments, in order to determine which item-pairs show a level of complementary recommendation, Gaussian embedding can be conducted to perform topic disambiguation and to determine levels of complementary items between item pairs co-purchased by users.

Graphs 603-604 illustrate the same examples of multi-topic disambiguation of baking soda as in graph 602, but further illustrate personalized Gaussian mixtures of product-types (e.g., or baking soda) that are shown in dashed ellipses for a User 1 and a User 2, respectively, showing how different users can have a different intent. Gaussian mixtures 607 and 609 can be similar or identical to Gaussian mixture 605, and Gaussian mixtures 608 and 610 can be similar or identical to Gaussian mixture 606. As shown in graph 603, baking soda #2 (associated with cleaning products) contributes more to the interest of User 1 than baking soda #1 (associated with baking). As shown in graph 604, baking soda #1 (associated with baking) contributes more to the interest of User 2 than baking soda #2 (associated with cleaning products).

Figure 7A:
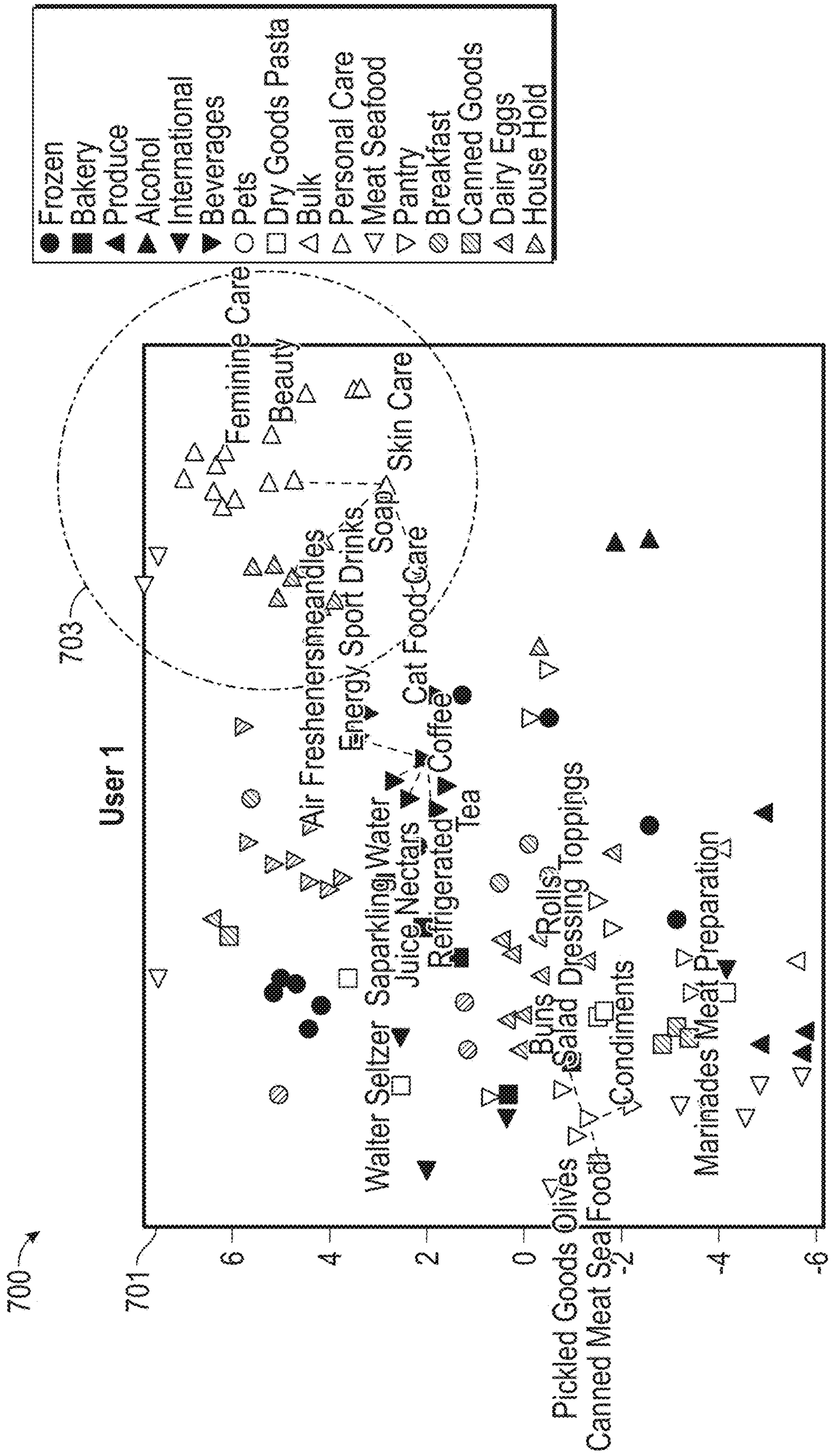
FIG. 7A illustrates illustrate exemplary scatter charts.
Figure 7B:
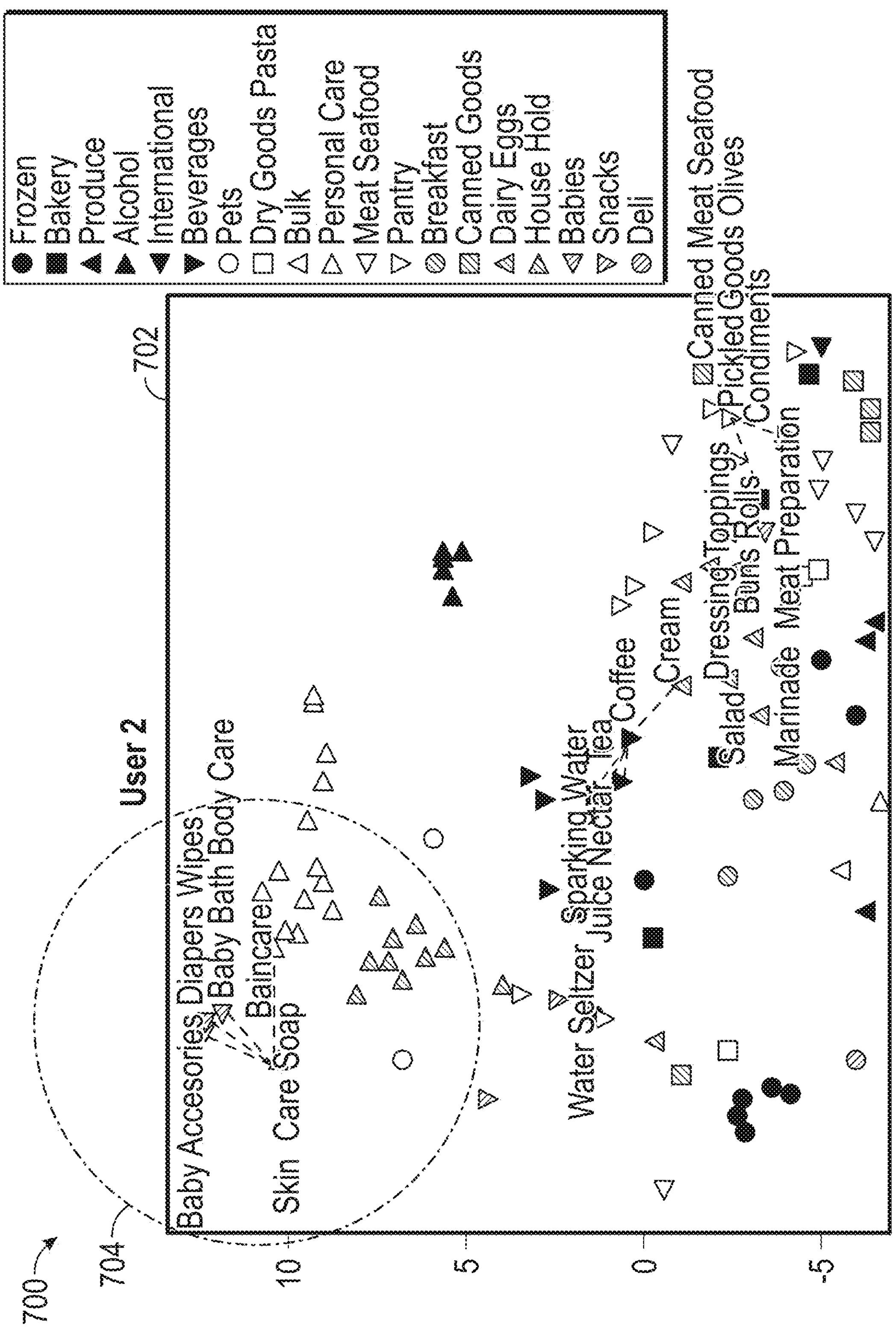
FIG. 7B illustrates illustrate exemplary scatter charts.

In several embodiments, topic disambiguation also can be modeled by personalize projections of product-types. Turning ahead in the drawings, FIG. 7A and FIG. 7B illustrates personalized projections 700 to show a degree of different preferences among users for personalized product-types for skin care based on historical user co-purchase transactions.

Personalized projection 701 is a scatter chart for user 1, which illustrates a personalized product-type of a user 1 based on product types for skin care. Cluster 703 illustrates that user 1 shows a preference for personal skin products, as indicated by the larger number of transactions for feminine care beauty than other items in this product-type. Thus, a suitable complimentary item for user 1 can be for feminine care beauty.

Personalized projection 702 is scatter chart for user 2, which illustrates a personalized product-type of a user 2 also based on product types for skin care, similar to user 1 in personalized projection 701. Cluster 704 illustrates that user 2 shows a preference for skin care for baby products, as indicated by the large number of transactions for baby accessories than other items in this product-type. Thus, a suitable complimentary item for user 2 can be for skin care products for babies.

Turning ahead in the drawings, FIG. 8 illustrates a flow chart for a method 800, according to another embodiment. In some embodiments, method 800 can be a method of automatically determining complimentary items recommendations. In many embodiments, determining complimentary items recommendations can be implemented based on a machine-learning model. Method 800 is merely exemplary and is not limited to the embodiments presented herein.

Method 800 can be employed in many different embodiments and/or examples not specifically depicted or described herein. In some embodiments, the procedures, the processes, and/or the activities of method 800 can be performed in the order presented. In other embodiments, the procedures, the processes, and/or the activities of method 800 can be performed in any suitable order. In still other embodiments, one or more of the procedures, the processes, and/or the activities of method 800 can be combined or skipped. In several embodiments, system 300 (FIG. 3) can be suitable to perform method 800 and/or one or more of the activities of method 800.

In these or other embodiments, one or more of the activities of method 800 can be implemented as one or more computing instructions configured to run at one or more processors and configured to be stored at one or more non-transitory computer-readable media. Such non-transitory computer-readable media can be part of a computer system such as complimentary recommender system 310 (FIG. 3) and/or web server 320 (FIG. 3). The processor(s) can be similar or identical to the processor(s) described above with respect to computer system 100 (FIG. 1).

Referring to FIG. 8, method 800 optionally can include, before an activity 810 (described below), an activity 805 of training a machine-learning model to learn item-level embedding Gaussian distributions for items, the user embedding, and the product-type embedding Gaussian mixture distributions based on co-purchase item pairs in historic activity data of the user and product-type pairs in an item taxonomy. In some embodiments, training the machine-learning model can include a training pipeline that can perform iterations of looping over item pairs, product-type pairs and users and minimize the loss functions until a stop criteria occurs. In several embodiments, co-purchase item pairs can include a product-type embedding represented by a Gaussian mixture distribution. In various embodiments, activity 805 can be performed as shown in FIG. 9, described below.

Turning ahead in the drawings, FIG. 9 illustrates a flow chart for a method 805, according to another embodiment. In some embodiments, method 805 can be a method of automatically determining complimentary items recommendations. In many embodiments, determining complimentary items recommendations can be implemented based on a machine-learning model. Method 805 is merely exemplary and is not limited to the embodiments presented herein. Method 805 can be employed in many different embodiments and/or examples not specifically depicted or described herein. In some embodiments, the procedures, the processes, and/or the activities of method 805 can be performed in the order presented. In other embodiments, the procedures, the processes, and/or the activities of method 805 can be performed in any suitable order. In still other embodiments, one or more of the procedures, the processes, and/or the activities of method 805 can be combined or skipped. In several embodiments, system 300 (FIG. 3) can be suitable to perform method 800 and/or one or more of the activities of method 805.

Referring to FIG. 9, method 805 can include an activity 905 of retrieving respective Gaussian distribution representations of each item of an item pair. In some embodiments, two items added to a basket can be treated as a co-purchase by a user u. In various embodiments, each item in a pair of co-purchase items can be modeled by a Gaussian distribution for an item q. In various embodiments, an item-level embedding using Gaussian Distribution for an item q can be stored in item-level embedding 409 (FIG. 4) and can be expressed as:

$$\mathcal{N}\left(x;\mu_q,\sum\nolimits_q\right).$$

where μ refers to the mean vector of Gaussian Distribution and Σ refers to the covariance matrix of Gaussian Distribution.

In several embodiments, a vector representation of a user u can be stored in user embedding 410 (FIG. 4) and can be expressed as:

$$\theta_u$$

In various embodiments, activity 905 can look up representations for a training sample item pair (q,r) and a user $u_1$.

In several embodiments, method 805 also can include an activity 910 of determining an item complementarity metric between each item of the item pair using a probability product kernel. The probability product kernel E(q,r) is expressed in Equations 1 and 2:

$$E(q,r)=\int_{x\in R^D}\mathcal{N}\left(x;\mu_q,\sum\nolimits_q\right)\mathcal{N}\left(x;\mu_r,\sum\nolimits_r\right)dx \quad (1)$$

$$=\mathcal{N}\left(0;\mu_q-\mu_r,\sum\nolimits_q+\sum\nolimits_r\right) \quad (2)$$

The logarithm of E(q,r) is defined as $\varepsilon_{q,r}$ as expressed in Equation 3.

$$\varepsilon_{q,r}.\equiv\log\mathcal{N}(0;\mu_q-\mu_r,\Sigma_q+\Sigma_r= \quad (3)$$
$$-\frac{1}{2}\text{logdet}(\Sigma_q+\Sigma_r)-\frac{D}{2}\log(2\pi)-\frac{1}{2}(\mu_q-\mu_r)^T(\Sigma_q+\Sigma_r)^{-1}(\mu_q-\mu_r)$$

where T refers to the transpose of vector and −1 refers to the inverse operation of a matrix.

In various embodiments, method 805 additionally can include an activity 915 of determining a user-to-item preference metric for both items in the item pair. In several embodiments, equations 4-6 below can be used to model a user preference for an item based on historical user transaction records. In various embodiments, the user preference on item i, can include a negative sample i', which can include an item not added to cart by the same user u.

$$L_{BPR}(u,i)=1-\sigma\left(\theta_u^T\mu_i-\theta_u^T\mu_{i'}\right) \quad (4)$$

where $$\sigma(x)=\frac{1}{1+e^{(-x)}}$$

is the sigmoid function, L refers the loss and BPR refers to bayesian personalized ranking.

In various embodiments, given a pair of co-purchase items (q, r), creating a user preference modeling on both q and r can be expressed in Equation 5 and 6:

$$L_{BPR}(u, q) = 1 - \sigma(\theta_u^T \mu_q - \theta_u^T \mu_{q'}) \quad (5)$$

$$L_{BPR}(u, r) = 1 - \sigma(\theta_u^T \mu_r - \theta_u^T \mu_{r'}) \quad (6)$$

where q' and r' refer to the negative samples of q and r respectively.

In several embodiments, method 805 further can include an activity 920 of generating loss functions based on the item complementarity metric and the user-to-item preference metric. In some embodiments, generating loss functions can be combined with two or more loss functions for optimization and automatic parameter learning, where $m_i$ refers to a margin (hyperparameter) set before training. In various embodiments, given a pair of co-purchase items (q, r), a loss function can be created by:

$$L_{item}(q, r, r') = \max(0, m_i - \log E(q, r) + \log E(q, r')) \quad (7)$$

where the subscript item for Litem (q, r, r') refers to the item-level loss.

For user preference, the loss functions are expressed in Equations 7.1 and 7.2, given a pair of co-purchase items (q, r), based on creating user preference modeling on both q and r:

$$L_{BPR}(u, q) = 1 - \sigma(\theta_u^T \mu_q - \theta_u^T \mu_{q'}) \quad (7.1)$$

$$L_{BPR}(u, r) = 1 - \sigma(\theta_u^T \mu_r - \theta_u^T \mu_{r'}) \quad (7.2)$$

where q' and r' refer to the negative samples of q and r respectively.

In many embodiments, activities 905, 910, 915, and 920 can be performed, for the item pair of the co-purchase item pairs.

In some embodiments, method 805 also can include an activity 925 of retrieving respective Gaussian mixture representations of each product type of a product-type pair. In several embodiments, each product-type in a pair of co-purchase product-type can be modeled by a Gaussian Mixture distribution for a product-type $c^q$, expressed as:

$$\Sigma_k w_{c^q,k} \mathcal{N}(x; \mu_{c^q,k}, \Sigma_{c^q,k})$$

where $\Sigma_k w_{c^q,k}=1$, which can be shared by records of all users, k refers to the index of components of the Gaussian Mixture, and $w_{c^q,k}$ is the component weight for the k-th component $\mathcal{N}(x; \mu_{c^q,k}, \Sigma_{c^q,k})$ of the product-type $c^q$.

In many embodiments, method 805 further can include an activity 930 of determining a non-personalized product-type complementarity metric at a global level between each product type of the product-type pair using a probability product kernel with a non-personalized component weight. In several embodiments, determining a non-personalized product-type can be based on a model product-type complementarity with a probability product kernel at a global level with non-personalized component weight. In various embodiments, a given pair of co-purchase product-types ($c^q$, $c^r$), can reuse Equation 1, described above, to compute the interaction between two components from two different Gaussian Mixture distributions.

In several embodiments, in order to machine-learn the multi-topic pattern shared by all the users for stability, the component weights $w_k$ in each Gaussian Mixture can be used for all co-purchase product-type records (non-personalized). In some embodiments, determining a non-personalized product-type complementarity metric can involve computing an interaction between Gaussian Mixtures of two co-purchase Product-types $E_m(c^q, c^r)$ given a pair of co-purchase product-type ($c^q$, $c^r$), with each Gaussian Mixture representation, expressed by:

$$\sum_{k=1}^{K} w_{c^q,k} \mathcal{N}\left(\mu_{c^q,k}, \sum_{c^q,k}\right) \text{ and } \sum_{h=1}^{K} w_{c^r,h} \mathcal{N}\left(\mu_{c^r,h}, \sum_{c^r,h}\right) \quad (8)$$

$$\text{respectively, } \log E_m(c^q, c^r) = \log\left(\sum_{k=1}^{K} \sum_{h=1}^{K} w_{c^q,k} w_{c^r,h} \exp(\xi_{k,h})\right),$$

Here, $\xi_{k,h} \equiv \log \mathcal{N}(0; \mu_{c^q,k} - \mu_{c^r,k}, \Sigma_{c^q,k} + \Sigma_{c^r,h})$ and $\exp(x)=e^x$ refers to the exponential function with the base of e which is a mathematical constant also known as Euler's number. k and h refer to the index of components of the Gaussian Mixture for the summation operation over the Gaussian Mixture components of product-type $c^q$ and $c^r$ respectively.

In many embodiments, since the component weights can be not personalized, the loss function can be derived from $\mathcal{L}_{global}$, expressed as:

$$L_{global}(c^q, c^r, c^{r'}) = \max(0, m_c - \log E_m(c^q, c^r) + \log E_m(c^q, c^{r'})), \quad (9)$$

where mc refers to the margin (hyperparameter) set before training and global refers to the non-personalization.

In several embodiments, method 805 additionally can include an activity 935 of determining a personalized product-type complementarity metric at an individual level between each product type of the product-type pair using the probability product kernel with a personalized component weight. For a given pair of co-purchase product-types $c^q$, $c^r$ and a user $u_2$, Equation 1, described above, can be reused to compute the interaction between two components from two different Gaussian Mixture. In various embodiments, in order to machine-learn the multi-topic pattern for the individual user $u_2$, the component weights in each Gaussian Mixture can be personalized. The components of product-types' Gaussian Mixture can be reused and the personalized component weights by the affinity between a user's embedding and the component location can be computed.

For example, given a product-type $c^q$, and the product-type's Gaussian Mixture $\Sigma_k w_{c^q,k} \mathcal{N}(x; \mu_{c^q,k}, \Sigma_{c^q,k})$, replace the non-personalized component weights $w_{c^q,k}$ with the personalized component weights. For the k-th component, its personalized component weight can be marked as $p_{c^q,k}$, which can be expressed as:

$$p_{c^q,k} \propto \theta_u^T \mu_{c^q,k}$$

The personalized component weights can be normalized such that their sum is 1.

In several embodiments, the components of product-types' Gaussian Mixture can be reused and the personalized component weights by the affinity between a user's embedding and the component location can be computed. For the k-th component, a personalized component weight can be marked as $p_{c^q,k}$, which can be expressed as:

$$p_{c^q,k} \propto \theta_u^T \mu_{c^q,k}$$

The personalized component weights can be normalized such that their sum is 1. In some embodiments, reusing Equation 8 with personalized component weights (which can be the same components) can include a personalized interaction $E_m(c^q, c^r|u)$ between two co-purchased product-types, expressed by:

$$\log E_m(c^q, c^r) = \log\left(\sum_{k=1}^{K}\sum_{h=1}^{K} p_{c^q,k} p_{c^r,h} \exp(\xi_{k,h})\right).$$

In some embodiments, method 805 further can include an activity 940 of generating loss functions based on the non-personalized product-type complementarity metric and the personalized product-type complementarity metric. For personalized co-purchase product-types interaction, we can derive the Loss function $\mathcal{L}_{indv}$ for this interaction:

$$L_{indv}(c^q, c^{r'} \mid u) = \max(0, m_p - \log E_m(c^q, c^r \mid u) + \log E_m(c^q, c^{r'} \mid u)) \quad (10)$$

where $m_p$ refers to the margin (hyperparameter) set before training and the subscript indv in $L_{indv}(c^q, c^r|u)$ refers to the loss at the level of an individual user. In a number of embodiments, activities 925, 930, 935, and 950 can be performed for a product-type pair of the product-type pairs.

In various embodiments, method 805 also can include an activity 945 of optimizing loss functions using gradient descent. In some embodiments, all the aforementioned loss functions can be optimized using by a gradient descent method. In several embodiments, using the gradient descent method can updated the parameters (item, user, and product-type). In some embodiments, after one completed iteration, a new input sample can be used in the recommender system (training pipeline) that can automatically mine the multi-topic, user-topic-preference and item-complementarity as well as user-item preference simultaneously.

In various embodiments, by using two pathways, one for items (e.g., activities 905, 910, 915, 920) and the other for product-type (e.g., activities 925, 930, 935, 940), the training framework can optimize the parameters by allowing the training samples of the item-part and the product-type-part to be different. For example, for each update, the pipeline can take an item pair and user $u_1$ for item part training while a different co-purchase product-type pairs and user $u_2$ for product-type part training.

In several embodiments, method 805 additionally can include an activity 950 of updating the item-level embedding Gaussian distributions, the user embedding, and the product-type embedding Gaussian mixture distributions based on hyperparameters of the loss functions, as optimized. For example, the outputs of the optimizing in activity 945 can be stored in item-level embedding Gaussian distribution 409 (FIG. 4), user embedding 410 (FIG. 4), and/or product-type-level embedding Gaussian mixture distribution 411 (FIG. 4).

Returning to FIG. 8, in a number of embodiments, method 800 also can include an activity 810 of receiving a request for personalized complementary item recommendations for an anchor item and a user. For example, a user can select to view an item page for an anchor item, which can generate a request to generate personalized complementary item recommendations for the user based on the anchor item.

In some embodiments, method 800 further can include an activity 815 of generating personalized product-type metrics for the user based at least in part on a user embedding for the user and product-type embedding Gaussian mixture distributions. In several embodiments, generating personalized recommendations can include computing the personalized product-type for user u. The personalized product-type of $c^q$ can be defined as the weighted average of its component's mean vector $\mu_{c^q,k}$ with personalized component weights $p_{c^q,k}$.

$$\mu_{c^q,\mu} = \sum_{k=1}^{K} P_{c^q,k}\mu_{c^q,k} \quad (11)$$

where c refers to the product-type, q refers to an item from the query (request), and k refers to the index of components of the Gaussian Mixture for the summation operation. In several embodiments, equation 11 also can be used for other product-types based on the preference of user u for the product-type.

In various embodiments, method 800 also can include an activity 820 of determining top product types based at least in part on personalized product-type complementarity metrics generated using the personalized product-type metrics and cosine similarity measurements. In several embodiments, the set of first items associated with the top product types can be determined using an item taxonomy. In some embodiments, each item can be mapped to a respective product-type. In some embodiments, activity 820 can be performed by using the computed personalized product-types in activity 815 to compute personalized product-type complementarity by the cosine similarity between the personalized product-type mu and the personalized product-types of other product-types. In several embodiments, the top-Z product-types with biggest cosine similarity measurements can be retained. The cosine similarity can measure a degree or level of similarity between two product-types. A larger cosine similarity can indicate that two product-types are more similar than other product-types.

In some embodiments, method 800 further can include an activity 825 of generating a set of first items associated with the top product-types. In various embodiments, activity 825 can involve using the top-Z relevant product-types and taxonomy information, and taking the union of all of the items to form the set of first items, $I_{R,u}$, as expressed in Equation 12:

$$I_{R,u} = \bigcup_{r=1}^{Z} tax^{-1}(c^r) \quad (12)$$

where R refers to a recalled candidate items, Z refers to the number of top-Z items, r refers to an index for the union operation, c refers to the product-type, tax(x) refers to a mapping from an item to its product-type and $tax^{-1}(x)$ refers to the inverse mapping from a product-type to a set of items under the product-type.

In a number of embodiments, method 800 additionally can include an activity 830 of ranking each respective item in the set of first items based on a respective item-to-item complementarity metric for the each respective item generated using an item-level embedding Gaussian distribution for the anchor item and a respective item-level embedding Gaussian distribution for the each respective item. In several embodiments, the respective item-to-item complementarity metric for the each respective item can be generated using a cosine similarity measurement between a mean vector of the item-level embedding Gaussian distribution for the anchor item and a respective mean vector of the respective item-level embedding Gaussian distribution for the each respective item. In various embodiments, ranking the items in the item set by item-item complementarity can include, for each item i in the set of first items generated in activity 825, using the mean vector of its Gaussian representation to compute the complementarity by the cosine similarity between the mean vector of the query item $\mu_q$ and each item $\mu_i$ in the set of first items generated in activity 825, then, ranking all of the respective items in the item set by each respective cosine similarity.

In some embodiments, method 800 further can include an activity 835 of selecting a set of top items as the personalized complementary item recommendations based on the ranking. In several embodiments, activity 835 can involve retaining or saving the top-N items ranked in activity 830 as output. In several embodiments, activities 815, 820, 825, 830, and/or 835 can be performed for each request of each user u and query item q.

Returning back in the drawings to FIG. 3, in a number of embodiments, communication system 311 can at least partially perform activity 403 (FIG. 4) of data processing of receiving co-purchase item pairs and product-type pairs, activity and/or activity 810 (FIG. 8) of receiving a request for personalized complementary item recommendations for an anchor item and a user.

In various embodiments, machine-learning system 312 can at least partially perform activity 501 (FIG. 5) of reading item, user, and product-type representations from the models trained, activity 805 (FIG. 8) of training a machine-learning model to learn item-level embedding Gaussian distributions for items, the user embedding, and the product-type embedding Gaussian mixture distributions based on co-purchase item pairs in historic activity data of the user and product-type pairs in an item taxonomy, activity 905 (FIG. 9) of retrieving respective Gaussian distribution representations of each item of the item pair, activity 910 (FIG. 9) of determining an item complementarity metric between each item of the item pair using a probability product kernel, activity 915 (FIG. 9) of determining a user-to-item preference metric for both items in the item pair; activity 920 (FIG. 9) of generating loss functions based on the item complementarity metric and the user-to-item preference metric, activity 925 (FIG. 9) of retrieving respective Gaussian mixture representations of each product type of the product-type pair, activity 930 (FIG. 9) of determining a non-personalized product-type complementarity metric at a global level between each product type of the product-type pair using a probability product kernel with a non-personalized component weight, activity 935 (FIG. 9) of determining a personalized product-type complementarity metric at an individual level between each product type of the product-type pair using the probability product kernel with a personalized component weight; activity 940 (FIG. 9) of generating loss functions based on the non-personalized product-type complementarity metric and the personalized product-type complementarity metric, activity 945 (FIG. 9) of optimizing loss functions using gradient descent, and/or activity 950 (FIG. 9) of updating the item-level embedding Gaussian distributions, the user embedding, and the product-type embedding Gaussian mixture distributions based on hyperparameters of the loss functions, as optimized.

In several embodiments, generating system 313 can at least partially perform activity 405 (FIG. 4) of to determine pair each co-purchased item another item and/or to process each item in a pair of co-purchased items by a Gaussian distribution with a user to determine whether each pair can be a complementary pair or whether each pair cannot be a complementary pair, activity 406 (FIG. 4) can model item complementarity with a probability product kernel, activity 407 (FIG. 7) can model user-to-item preference for both items in the item pair activity, activity 408 (FIG. 4) of optimization of loss functions for automatic parameter learning, activity 412 (FIG. 4) of product-type modeling, activity 413 (FIG. 4) of product-type level modeling to determine complimentary items in product-types from a catalog, activity 414 (FIG. 4) can model product-type complementarity with probability product kernel at global level with non-personalized component weight, activity 502 (FIG. 5) of computing personalized product-types from user embedding, activity 815 (FIG. 8) of generating personalized product-type metrics for the user based at least in part on a user embedding for the user and product-type embedding Gaussian mixture distributions, and/or activity 825 (FIG. 8) of generating a set of first items associated with the top product-types.

In many embodiments, ranking system 314 can at least partially perform activity 503 (FIG. 5) of computing a top-Z relevant product types for the query item and the user activity, activity 505 (FIG. 5) of generating a first item set of complimentary items by using the top-Z product-types, activity 830 (FIG. 8) of ranking each respective item in the set of first items based on a respective item-to-item complementarity metric for the each respective item generated using an item-level embedding Gaussian distribution for the anchor item and a respective item-level embedding Gaussian distribution for the each respective item and/or activity 835 (FIG. 8) of selecting a set of top items as the personalized complementary item recommendations based on the ranking.

In some embodiments, personalization system 315 can at least partially perform activity 820 (FIG. 8) of determining top product types based at least in part on personalized product-type complementarity metrics generated using the personalized product-type metrics and cosine similarity measurements.

In several embodiments, web server 320 can at least partially perform sending instructions to user computers (e.g., 340-341) based on information received from communication system 311.

In a number of embodiments, the techniques described herein can advantageously provide a consistent user experience by dynamically determining which complimentary item can be recommended when the anchor item with multi-topic uses by using Gaussian distribution and Gaussian mixture distribution using a complimentary recommender system, such as complimentary recommender system 310 (FIG. 3). In some embodiments, the techniques provided herein can beneficially reduce computing resources and costs. For example, an online catalog can include approximately one hundred million items and/or products at any given period of time. In various embodiments, the techniques described herein can be an improvement over conventional recommender systems for online shopping. For example, the techniques herein can automatically learn the item-to-item and product-type-to-product-type complementarity as well as the multi-topic complementarity and the user-topic preference for semantic complementary item recommendation, which can be intractable for humans to learn over thousands and millions of items. Additionally, the complimentary recommender system can allow asynchronous updates of item-part and product-type part. In many embodiments, the complimentary recommender system can be automatic via machine learning algorithms and tasks, unlike conventional grocery recommender systems without such grocery recommender systems In many embodiments, the techniques described herein can be used continuously at a scale that cannot be handled using manual techniques. For example, the number of daily and/or monthly visits to a website can exceed approximately ten million and/or other suitable numbers and/or the number of products and/or items sold on the website can exceed approximately ten million (10,000,000) approximately each day.

In a number of embodiments, the techniques described herein can solve a technical problem that arises only within the realm of computer networks, as determining which item to recommend to a user for an anchor item with multi-use topics does not exist outside the realm of computer networks. Moreover, the techniques described herein can solve a technical problem that cannot be solved outside the context of computer networks. Specifically, the techniques described herein cannot be used outside the context of computer networks, in view of a lack of data, and because a catalog, such as an online catalog, that can power and/or feed an online website that is part of the techniques described herein would not exist.

Various embodiments can include a system including one or more processors and one or more non-transitory computer-readable media storing computing instructions configured to run on the one or more processors and perform certain acts. The acts can include receiving a request for personalized complementary item recommendations for an anchor item and a user. The acts also can include generating personalized product-type metrics for the user based at least in part on a user embedding for the user and product-type embedding Gaussian mixture distributions. The acts additionally can include determining top product types based at least in part on personalized product-type complementarity metrics generated using the personalized product-type metrics and cosine similarity measurements. The acts further can include generating a set of first items associated with the top product-types. The acts also can include ranking each respective item in the set of first items based on a respective item-to-item complementarity metric for the each respective item generated using an item-level embedding Gaussian distribution for the anchor item and a respective item-level embedding Gaussian distribution for the each respective item. The acts further can include selecting a set of top items as the personalized complementary item recommendations based on the ranking.

A number of embodiments can include a method being implemented via execution of computing instructions configured to run at one or more processors and stored at one or more non-transitory computer-readable media. The method can include receiving a request for personalized complementary item recommendations for an anchor item and a user. The method further can include generating personalized product-type metrics for the user based at least in part on a user embedding for the user and product-type embedding Gaussian mixture distributions. The method additionally can include determining top product types based at least in part on personalized product-type complementarity metrics generated using the personalized product-type metrics and cosine similarity measurements. The method also can include generating a set of first items associated with the top product-types. The method further can include ranking each respective item in the set of first items based on a respective item-to-item complementarity metric for the each respective item generated using an item-level embedding Gaussian distribution for the anchor item and a respective item-level embedding Gaussian distribution for the each respective item. The acts also can include selecting a set of top items as the personalized complementary item recommendations based on the ranking.

Various embodiments include a system including one or more processors and one or more non-transitory computer-readable media storing computing instructions that, when executed on the one or more processors, cause the one or more processors to perform certain acts. The acts can include generating, using a trained machine-learning model, personalized product-type metrics for a user based on historic activity of the user and product-type pairs in an item taxonomy. The acts also can include determining, using the personalized product-type metrics for the user, top product types for the user based on an anchor item. The acts further can include determining a set of first items associated with the top product types. The acts additionally can include ranking each item in the set of first items using at least item-level embedding Gaussian distributions for (i) the anchor item and (ii) for each item in the set of first items. The acts also can include selecting, based on the ranking, a set of top items from the set of first items to be personalized complementary item recommendations for the user based on the anchor item.

Several embodiments include a method implemented via execution of computing instructions configured to run on one or more processors and stored at one or more non-transitory computer-readable media. The method can include generating, using a trained machine-learning model, personalized product-type metrics for a user based on historic activity of the user and product-type pairs in an item taxonomy. The method also can include determining, using the personalized product-type metrics for the user, top product types for the user based on an anchor item. The method further can include determining a set of first items associated with the top product types. The method additionally can include ranking each item in the set of first items using at least item-level embedding Gaussian distributions for (i) the anchor item and (ii) for each item in the set of first items. The method also can include selecting, based on the ranking, a set of top items from the set of first items to be personalized complementary item recommendations for the user based on the anchor item.

Although multi-path complementary item recommendations and automatically determining complimentary items recommendations has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-9 may be modified, and that the foregoing discussion of certain of these embodiments does not necessarily represent a complete description of all possible embodiments. For example, one or more of the procedures, processes, or activities of FIGS. 4-5 and 8-9 may include different procedures, processes, and/or activities and be performed by many different modules, in many different orders, and/or one or more of the procedures, processes, or activities of FIGS. 4-5 and 8-9 may include one or more of the procedures, processes, or activities of another different one of FIGS. 4-5 and 8-9. As another example, the systems within complementary recommender system 310 (FIG. 3) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:

one or more processors; and one or more non-transitory computer-readable media storing computing instructions that, when executed on the one or more processors, cause the one or more processors to perform operations comprising:

training a machine learning model, to learn online element-level embedding distributions for online elements based on co-selection pairs in historic activity data, wherein training the machine learning model comprises:

partitioning data into a first sub-pipeline that includes an activity of modeling complementarity and a second sub-pipeline that includes an activity of modeling complementarity with non-personalized or personalized component weight, using the first sub-pipeline to determine a first complementarity metric using a probability kernel and generating one or more first loss functions based on the first complementarity metric, using the second sub-pipeline to determine a second complementarity metric at a global level or an individual level and generating one or more second loss functions based on the second complementarity metric, optimizing the one or more first loss functions and the one or more second loss functions using gradient descent, and updating one or more embeddings of the machine learning model based on the one or more first loss functions and the one or more second loss functions;

generating personalized metrics, associated with a computer, using the trained machine learning model;

determining, using the personalized metrics, top types based on an anchor;

determining a set of elements associated with the top types; and generating a ranking for the set of elements using at least the online element-level embedding distributions for (i) the anchor and (ii) for each element in the set of elements.

2. The system of claim 1, wherein the historic activity data comprises add-to-cart data.

3. The system of claim 1, wherein determining the set of elements comprises:

generating, by a cosine similarity measurement between a mean vector of an embedding for the anchor and a respective mean vector of an embedding for each respective item, a respective item-to-item complementarity metric for each respective item.

4. The system of claim 1, wherein the online element-level embedding distributions are item-level embedding Gaussian distributions for items.

5. The system of claim 4, wherein the item-level embedding Gaussian distributions are configured to model a correction for popular co-purchased items.

6. The system of claim 1, wherein the one or more first loss functions are further based on a user-to-item preference metric.

7. The system of claim 1, wherein training the machine learning model comprises:

training the machine learning model by updating the online element-level embedding distributions and a user embedding based on hyperparameters of one or more of the one or more first loss functions or the one or more second loss functions.

8. The system of claim 1, wherein the online element-level embedding distributions are product-type embedding Gaussian mixture distributions that are configured to model topic disambiguation among multi-topic product types.

9. The system of claim 1, wherein training the machine learning model further comprises:

retrieving respective Gaussian mixture representations of each product type of product-type pairs in an item taxonomy;

determining, using the second sub-pipeline, a non-personalized product-type complementarity metric at the global level between each product type of the product-type pairs using a probability product kernel with a non-personalized component weight; and determining a personalized product-type complementarity metric at the individual level between each product type of the product-type pair using a probability product kernel with a personalized component weight, wherein the second complementarity metric is the non-personalized product-type complementarity metric or the personalized product-type complementarity metric.

10. The system of claim 9, wherein training the machine-learning model further comprises:

generating the one or more second loss functions based on the non-personalized product-type complementarity metric and the personalized product-type complementarity metric.

11. A method implemented via execution of computing instructions configured to run on one or more processors and stored at one or more non-transitory computer-readable media, the method comprising:

training a machine learning model to learn item-level embedding distributions for items based on co-selection pairs in historic activity data, wherein training the machine learning model comprises:

partitioning data into a first sub-pipeline that includes an activity of modeling complementarity and a second sub-pipeline that includes an activity of modeling complementarity with non-personalized or personalized component weight, using the first sub-pipeline to determine a first complementarity metric using a probability kernel and generating one or more first loss functions based on the first complementarity metric, using the second sub-pipeline to determine a second complementarity metric at a global level or an individual level and generating one or more second loss functions based on the second complementarity metric, optimizing the one or more first loss functions and the one or more second loss functions using gradient descent, and updating one or more embeddings of the machine learning model based on the one or more first loss functions and the one or more second loss functions;

generating, using the machine learning model, personalized product-type metrics for a user based on historic activity of the user and based on product-type pairs in an item taxonomy;

determining, using the personalized product-type metrics for the user, top product types for the user based on an anchor item;

determining a set of first items associated with top product types; and ranking each item in the set of first items using at least item-level embedding distributions for (i) an anchor item and (ii) for each item in the set of first items.

12. The method of claim 11, wherein the historic activity of the user comprises add-to-cart data of the user.

13. The method of claim 11, wherein:

determining the set of first items associated with the top product types comprises:

generating, by a cosine similarity measurement between a mean vector of the item-level embedding distribution for the anchor item and a respective mean vector of an item-level embedding Gaussian distribution for each respective item, a respective item-to-item complementarity metric for each respective item; and ranking each item in the set of first items comprises:

ranking, by the respective item-to-item complementarity metric, each item in the set of first items.

14. The method of claim 11, further comprising:

for an item pair of co-purchase item pairs in the historic activity of the user:

retrieving respective Gaussian distribution representations of each item of the item pair;

determining, using a probability product kernel, an item complementarity metric between each item of the item pair; and determining a user-to-item preference metric for both items in the item pair.

15. The method of claim 11, wherein the one or more first loss functions are further based on a user-to-item preference metric.

16. The method of claim 11, further comprising:

updating the item-level embedding distributions, a user embedding, and a product-type embedding Gaussian mixture distributions based on hyperparameters of the one or more first loss functions.

17. The method of claim 16, wherein the product-type embedding Gaussian mixture distributions are configured to model topic disambiguation among multi-topic product types.

18. The method of claim 11, wherein the item-level embedding distributions are configured to model a correction for popular co-purchased items.

19. The method of claim 11, further comprising:

training a product-type embedding Gaussian mixture distributions for items for a product-type pair of the product-type pairs, wherein training the product-type embedding Gaussian mixture distributions comprises:

retrieving respective Gaussian mixture representations of each product type of the product-type pair;

determining a non-personalized product-type complementarity metric at a global level between each product type of the product-type pair using a probability product kernel with a non-personalized component weight; and determining a personalized product-type complementarity metric at an individual level between each product type of the product-type pair using a probability product kernel with a personalized component weight.

20. The method of claim 19, wherein the one or more second loss functions are further based on a non-personalized product-type complementarity metric.

* * * * *